United States Patent [19]

Masuo

[11] Patent Number: 4,955,980
[45] Date of Patent: Sep. 11, 1990

[54] THERMOMETER PROBE

[75] Inventor: Yoshihisa Masuo, Shiga, Japan

[73] Assignee: Omron Corporation, Kyoto, Japan

[21] Appl. No.: 327,389

[22] Filed: Mar. 20, 1989

Related U.S. Application Data

[63] Continuation of Ser. No. 210,169, Jun. 21, 1988, abandoned, which is a continuation of Ser. No. 914,254, Oct. 2, 1986, abandoned.

[30] Foreign Application Priority Data

Oct. 2, 1985 [JP] Japan .......................... 60-149964[U]

[51] Int. Cl.⁵ .......................... G01K 7/16; G01K 1/08
[52] U.S. Cl. .................................... 374/185; 374/208; 374/183; 136/233; 338/28
[58] Field of Search ............... 374/185, 208, 163, 179, 374/183, 178; 136/232, 233; 338/26, 27, 28, 30, 233, 229

[56] References Cited

U.S. PATENT DOCUMENTS

| | | | |
|---|---|---|---|
| 2,339,809 | 1/1944 | Ray | 136/233 |
| 2,526,251 | 10/1950 | Medlar | 338/30 |
| 2,529,038 | 11/1950 | Medlar et al. | 338/30 |
| 2,749,753 | 6/1956 | Adams | 374/183 |
| 3,314,129 | 4/1967 | Pugh et al. | 136/233 |
| 3,513,432 | 5/1970 | Davis | 136/233 |
| 3,531,993 | 10/1970 | Karn | 136/233 |
| 3,556,865 | 1/1971 | Levy | 136/233 |
| 3,592,059 | 7/1971 | Chilton | 374/163 |
| 3,878,722 | 4/1975 | Crites | 374/162 |
| 4,087,775 | 5/1978 | Mackenzie et al. | 338/28 |
| 4,277,886 | 7/1981 | Bauer et al. | 136/233 |
| 4,317,367 | 3/1982 | Schonberger | 374/185 |
| 4,437,084 | 3/1984 | Clayton, Jr. | 338/28 |
| 4,479,026 | 10/1984 | Brixy et al. | 374/185 |
| 4,528,542 | 7/1985 | Meune | 338/2 |
| 4,590,669 | 5/1986 | Imamura | 374/208 |
| 4,685,683 | 8/1987 | Hall et al. | 277/9 |
| 4,762,427 | 8/1988 | Hori et al. | 374/185 |

FOREIGN PATENT DOCUMENTS

| | | | |
|---|---|---|---|
| 2429482 | 1/1976 | Fed. Rep. of Germany | 374/185 |
| 0103435 | 8/1980 | Japan | 338/28 |
| 0086714 | 5/1982 | Japan | 374/208 |
| 0202038 | 11/1984 | Japan | 374/163 |
| 1103390 | 2/1968 | United Kingdom | 374/185 |
| 1521636 | 8/1978 | United Kingdom | 374/163 |

OTHER PUBLICATIONS

Grube et al., "Motorschutzkaltleiter C822 mit kurzer Ansprechzeit", Siemens–Zeitschrift, 43(1969) Heft 4, pp. 392–394.

Primary Examiner—Thomas B. Will
Attorney, Agent, or Firm—Wegner & Bretschneider

[57] ABSTRACT

A thermometer probe comprising a temperature sensing element for sensing temperature of an object to be sensed, a conductor connected to the temperature sensing element for transferring the sensed temperature, an insulator for coating the conductor, and a water-resistant sheath for enclosing the temperature sensing element, the conductor, and the insulator. The opening end of the sheath is welded for enclosure of the temperature sensing element.

4 Claims, 4 Drawing Sheets

THERMOMETER PROBE

This application is a continuation of U.S. application Ser. No. 210,169, filed June 21, 1988, now abandoned, which is a continuation of application Ser. No. 914,254, filed Oct. 2, 1986, now abandoned.

BACKGROUND AND SUMMARY OF THE INVENTION

This invention relates to a thermometer probe, more particularly to a thermometer probe for sensing temperature of a variety of liquids.

It is well known that a thermometer probe is used to sense the temperatures of various kinds of liquids, such as water under quality control in a filtration plant, and alcohol and soy sauce in the process of brewing. It is also well known that a thermometer probe for sensing the temperatures of such liquids is provided with water-resistant configuration. Heretofore, such a thermometer probe has had a complicated water-resistant configuration as shown in FIG. 6. A temperature sensing element (temperature sensor) 2 connected to lead 1 is coated with layers 3a and 3b made of silicon, epoxy resin, and polyurethane resin, further provided with cap 5 made of a material such as aluminum, acrylonitrile-butadiene-styrene copolymer (ABS), and polyvinyl chloride (PVC), and filled with an adhesive such as epoxy resin 4.

In the foregoing configuration, however, it is quite difficult to reduce the size of the probe and its manufacturing cost due to the use of dipping layers 3a and 3b, together with protection cap 5. In addition, in view of the operability or mobility of the probe, the length of the protection cap 5 is required to be less than 200 millimeters, so that no portion, other than the limited portion of the probe corresponding to protection cap 5, can be immersed in liquids. Thus, in the conventional configuration as shown in FIG. 6, it is quite difficult to sense the temperature of a liquid to be sensed in a convenient location.

It is, accordingly, a primary object of this invention to provide a thermometer probe which overcomes the above-mentioned disadvantages.

Another object is to provide a thermometer probe which is reduced both in size and cost.

It is still another object to provide a thermometer probe in which the portion to be immersed in liquids is not limited.

A further object is to provide a thermometer probe which can keep sensing the temperature of a desired location in the liquid over a long time period.

According to one aspect of this invention, there is provided a thermometer probe comprising a temperature sensing element for sensing the temperature of an object to be sensed, a conductive member connected to said temperature sensing element for transferring the sensed temperature to a thermometer main body, an insulating member for coating said conductive member, and a sheath member for enclosing said temperature sensing element, conductive member and insulating member, wherein the opening end of said sheath member is welded.

Other objects and numerous advantages of the thermometer probe according to this invention will become apparent from the following description when considered in conjunction with the accompanying drawings.

DETAILED DESCRIPTION OF THE INVENTION

Figure 1:
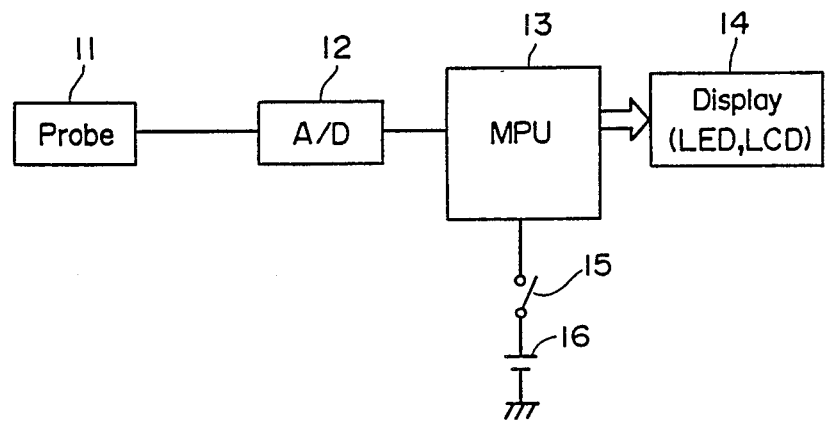
FIG. 1 is a block diagram showing the whole construction of a thermometer, including the thermometer probe of this invention.

In FIG. 1, there is shown a whole construction of a thermometer which includes thermometer probe 11 adapted to sense the temperature of an object to be sensed. The temperature data sensed by probe 11 are transferred through analog-to-digital converter 12 into microprocessing unit 13. The microprocessing unit 13 is driven by the actuation of power switch 15 which supplies power from battery 16 to the microprocessing unit. The microprocessing unit 13 processes the transferred temperature data temperature and sends the processed data to display 14 where the temperature of the object to be sensed is visually displayed.

Figure 2:
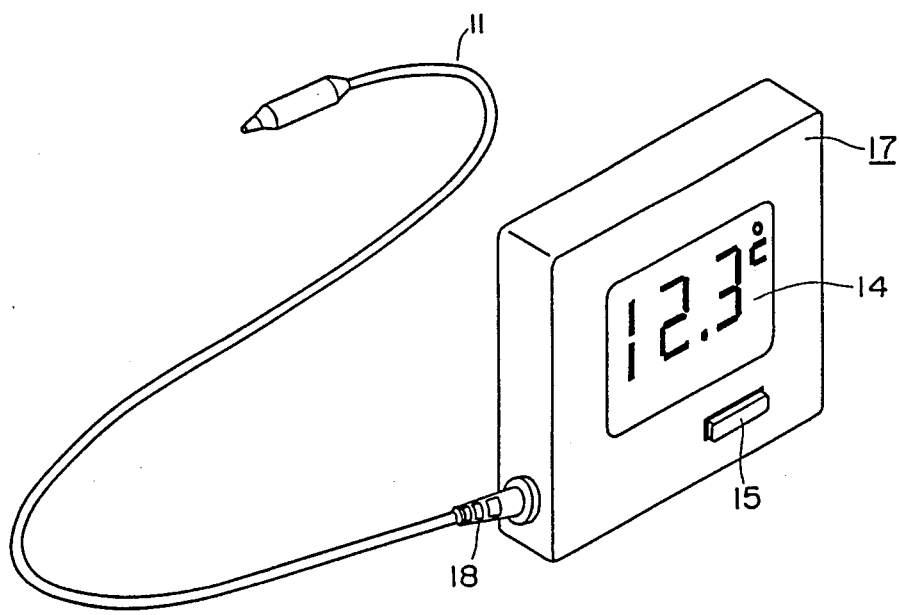
FIG. 2 is a perspective view of the thermometer of FIG. 1 illustrating a main body of the thermometer probe connected thereto.

In FIG. 2, there is shown a thermometer which is made up of two parts, thermometer probe 11 and thermometer main body 17. The thermometer probe 11 is securely connected to the main body 17 through grommet 18. The main body contains display 14, power switch 15, and battery 16.

Figure 3:
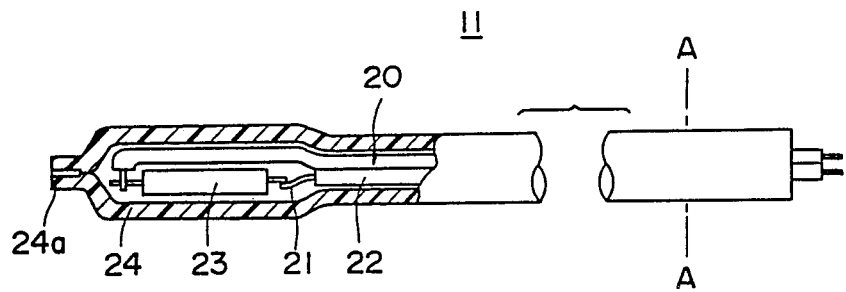
FIG. 3 is a sectional view of the thermometer probe of FIG. 1, illustrating a temperature sensing unit, conductive member, insulating member, and sheath member.
Figure 4:
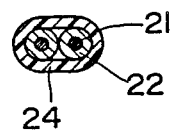
FIG. 4 is a sectional view of the thermometer probe taken along lines A—A of FIG. 3.
Figure 5A:
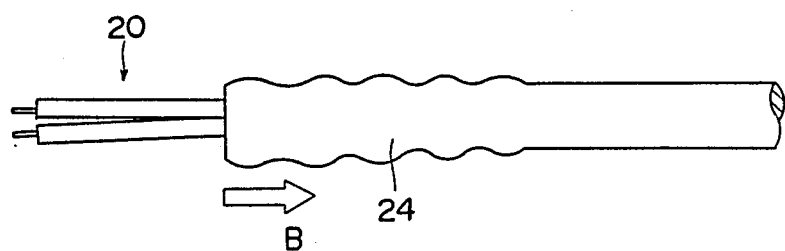
FIG. 5 is an explanatory view, illustrating each step of manufacturing the thermometer probe of FIG. 3.
Figure 5B:
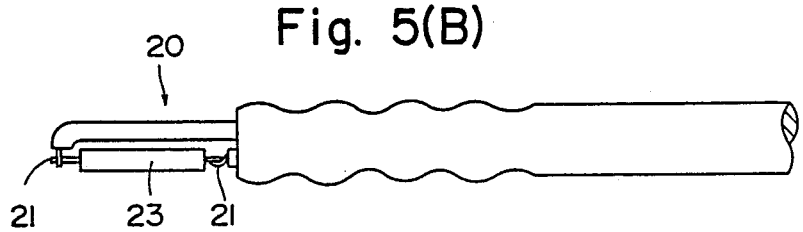
Figure 5C:
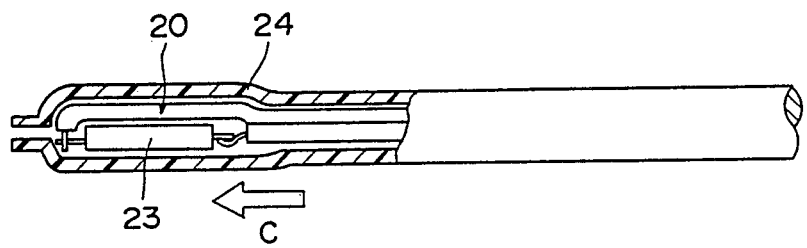
Figure 5D:
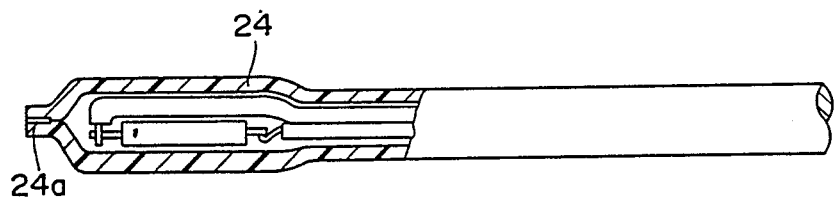
Figure 6:
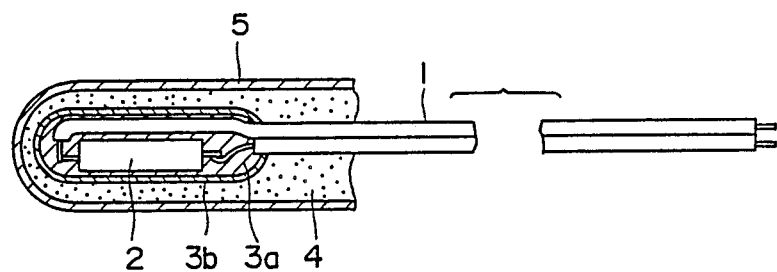
FIG. 6 is a sectional view of a conventional thermometer probe.

FIG. 3 shows a sectional view of an embodiment of thermometer probe 11 as shown in FIG. 1 and FIG. 2. In addition, FIG. 4 shows a sectional view taken along lines A—A of FIG. 3. A pair of leads 20 comprises a pair of core wires 21 made of annealed copper, and insulator 22 made of polyethylene which coats each core wire 11. One of the leads 20 is cut shorter than the other, so that the ends of the exposed portion of core wires 21 are connected to temperature sensing element 23, e.g., a thermistor, arranged substantially in parallel with the leads 20.

Water-resistant sheath 24 is adapted to enclose leads 20 and temperature sensing unit 23, the opening end 24a of which is closed by means of ultrasonic wave welding or thermal welding.

The sheath 24 is made of resin with a lower water absorption index such as polyethylene (PE), a polypropylene (pp), ethylene-tetrafluoride (PTFE), and propylene-tetra-hexafluoride.

In operation, the temperature sensing element 23 enclosed by sheath 24 is immersed into a liquid to sense its temperature. In response to the actuation of power switch 15, the sensed data of temperature is transferred through leads 20 into thermometer main body 17 and visually displayed on display 14.

FIG. 5 shows the manufacturing process of the thermometer probe as described in FIGS. 3 and 4. First, a pair of leads are exposed by squeezing the sheath 24 into a direction B (Step 1). It is noted that the sheath is formed loosely with respect to leads 20. To squeeze the sheath 24 easier, the sheath is preferably softened by applying heat prior to Step 1.

Second, one of the leads 20 is cut shorter than the other, so that the temperature sensing element 23 is connected by soldering between wire cores 21 substantially in parallel with the leads (Step 2).

Third, the sheath 24 is pulled back as shown in direction C to enclose leads 20 and temperature sensing element 23 (Step 3).

Finally, the opening end 24a of sheath 24 is closed by means of ultrasonic wave welding or thermal welding (Step 4).

It should be understood that the above description is merely illustrative of this invention and that many changes and modifications may be made without departing from the scope of the appended claims.

What is claimed is:

1. A thermometer probe for sensing the temperature of a liquid, comprising:

a temperature sensing element for sensing the temperature of said liquid;

first and second elongated conductive members connected on opposing sides of the temperature sensing element for communicating temperature information, wherein the first conductive member is shorter than the second conductive member, and wherein the first conductive member and the temperature sensing element when joined together form substantially the same length as the second conductive member;

first and second insulating members for coating the first and second conductive members, respectively; and an elongated water-resistant elastic sheath enclosing the temperature sensing element, the first and second conductive members, and the first and second insulating members, wherein the water-resistant elastic sheath has a distal end which is welded closed, wherein the water-resistant elastic sheath extends continuously from said distal end a distance substantially equal to the length of the elongated conductive members to at least a point remote from the temperature sensing element where no exposure to said liquid occurs, and wherein the water-resistant elastic sheath directly abuts the insulating members.

2. A thermometer probe according to claim 1, wherein the distal end is welded by means of ultrasonic wave welding.

3. A thermometer probe according to claim 1, wherein the distal end is welded by means of thermal welding.

4. A thermometer probe according to claim 1, wherein the water-resistant elastic sheath is an outer insulating layer of the conductive members having the insulating members, wherein the outer insulating layer is extensible for fitting and enclosing the temperature sensing element.

* * * * *